Dec. 16, 1952  J. B. ARMITAGE ET AL  2,621,566
MACHINE TOOL STRUCTURE AND TRANSMISSION MECHANISM
Original Filed Feb. 23, 1942  6 Sheets-Sheet 2

Inventors
JOSEPH B. ARMITAGE &
ORRIN W. BARKER
By W. D. O'Connor
Attorney

Inventors
JOSEPH B. ARMITAGE &
ORRIN W. BARKER
By
W. D. O'Connor
Attorney

Patented Dec. 16, 1952

2,621,566

UNITED STATES PATENT OFFICE 2,621,566

MACHINE TOOL STRUCTURE AND TRANSMISSION MECHANISM

Joseph B. Armitage, Wauwatosa, and Orrin W. Barker, Milwaukee, Wis., assignors to Kearney & Trecker Corporation, West Allis, Wis., a corporation of Wisconsin Original application February 23, 1942, Serial No. 431,908, now Patent No. 2,407,913, dated September 17, 1946. Divided and this application June 24, 1946, Serial No. 678,818

8 Claims. (Cl. 90—18)

This invention relates, generally, to machine tools and more particularly to improved machine tool structure and operating mechanism of the type especially adapted for utilization in milling machines.

This specification constitutes a division of application Serial No. 431,908, filed February 23, 1942, that issued as Patent No. 2,407,913, dated September 17, 1946.

A general object of the invention is to provide improved structural arrangements and actuating mechanism for a machine tool;

Another object is to provide an improved power transmitting mechanism for actuating the movable elements of a machine tool;

Another object is to provide an improved speed changing spindle driving mechanism for a machine tool;

Another object is to provide an improved construction of the guiding means for supporting a movable element of a machine tool;

A further object is to provide an improved clamping arrangement for a movable element of a machine tool.

According to this invention, a milling machine is provided with an improved spindle driving mechanism arranged to afford a series of spindle speeds in two ranges. The speeds are selected by pick-off gears and a shiftable back gear, the pick-off gears effecting a direct connection in one range and a connection through the intermediate back gear in another. An interlock is provided to prevent the application of a pick-off gear at the position effecting the direct connection when the back gear is engaged and vice-versa. Likewise, an improved arrangement is provided for supporting the spindle carrying head for vertical sliding movement and improved clamping means are provided for the head and for the overarms carried by the head.

The invention is exemplified herein by an embodying machine tool structure, but it is to be understood that the particular apparatus set forth is intended to be illustrative only and that the various individual characteristics may be embodied in other structural forms, all coming within the range of equivalents of the features defined in the subjoined claims.

The foregoing and other objects of this invention, which will be more readily discerned from the following detailed description, may be achieved by means of the illustrative apparatus depicted in, and described herein in connection with, the accompanying drawing in which.

The particular machine tool illustrated in the drawing as exemplifying a practical embodiment of the principles of the present invention, is a milling machine of the bed type, similar in general form and arrangement of parts to the milling machine shown in United States Patent No. 2,118,357 issued May 24, 1938.

Figure 1:
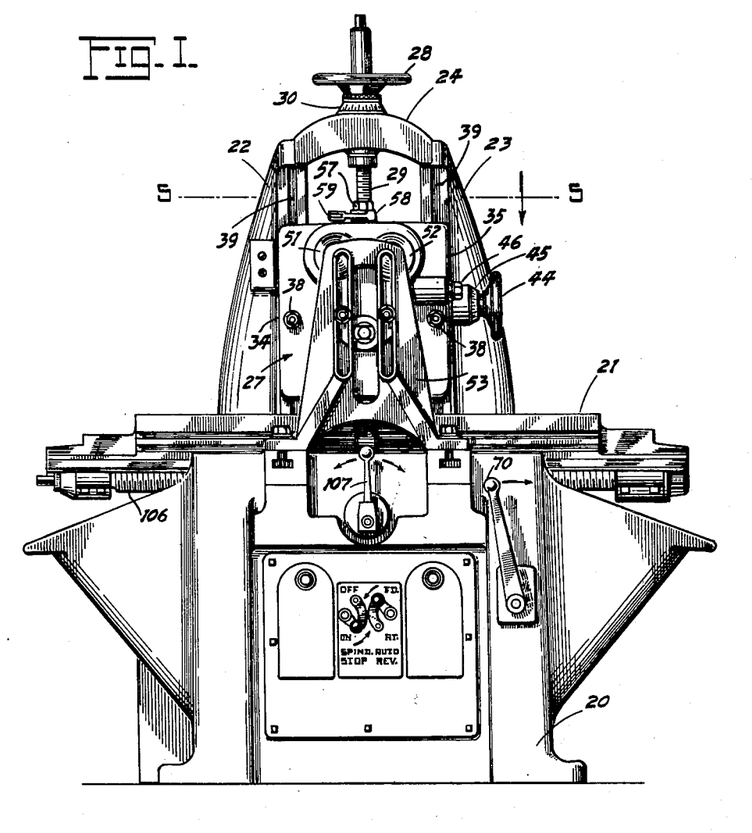
Figure 1 is a general view in front elevation of a milling machine exemplifying the type of machine tool in which the present invention may be incorporated to advantage.

Referring more specifically to Fig. 1 of the drawing, the milling machine there shown comprises essentially a hollow bed or base 20 that constitutes the main supporting frame of the machine and forms a housing for the driving and controlling mechanism.

Figures 2, 3, 4:
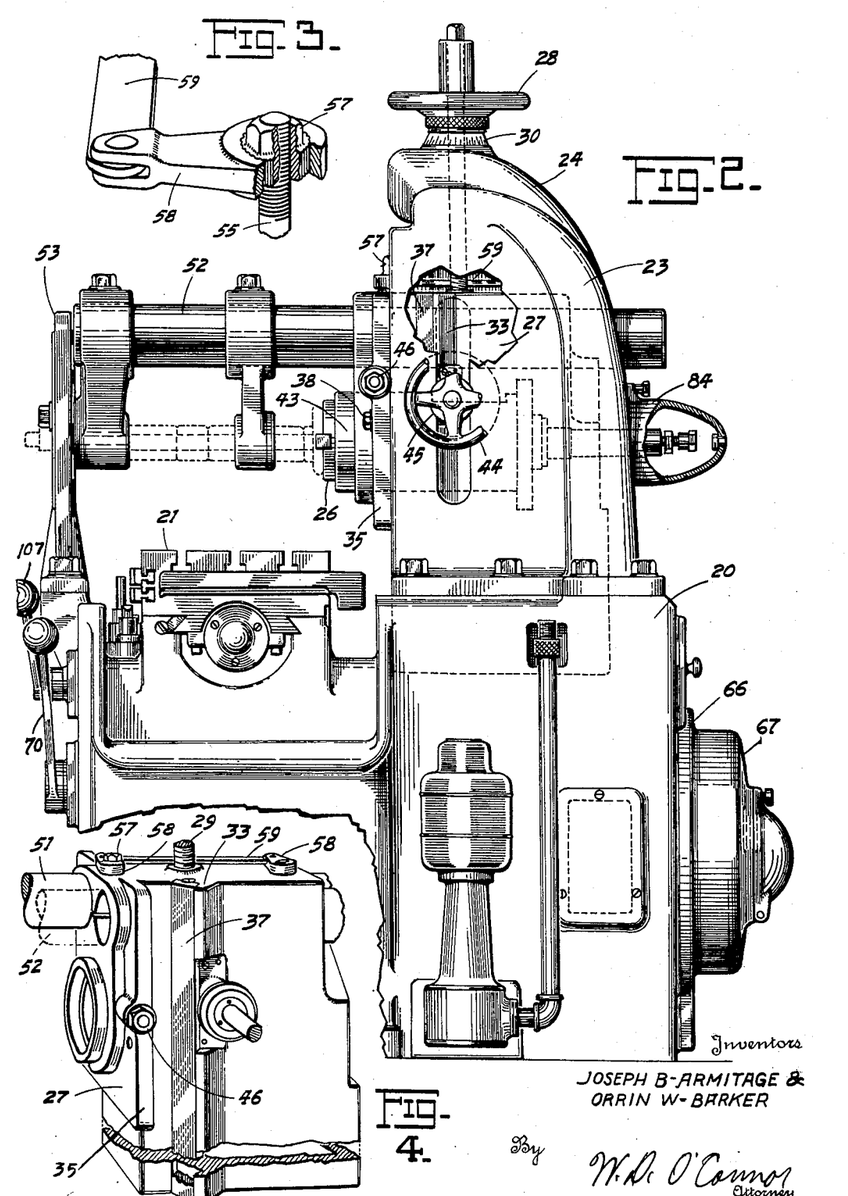
Fig. 2 is a view in side elevation of the milling machine shown in Fig. 1, with parts broken away.
Fig. 3 is a detailed view in perspective of a clamping device for the overarm structure of the milling machine.
Fig. 4 is a fragmentary view in perspective, showing the vertically movable spindle carrying head.

On the upper forward surface of the bed 20, a work supporting table 21 is slidably mounted for reciprocating movement longitudinally of the bed. At the rear of the table, a pair of uprights 22 and 23 are securely fixed to the upper surface of the bed 20 in spaced relationship and are joined at the top by a cap 24 to constitute a rigid upstanding column structure. As shown in Fig. 2, the column structure serves to support a rotatably mounted tool spindle 26 in cooperating relationship with the work table 21.

To provide for adjusting the position of the spindle 26 relative to the work table 21, the spindle is carried by a spindle supporting head or block 27 which is slidably mounted between the uprights 22 and 23 for vertical movement. Adjustment of the vertical position of the spindle head is effected by turning a combined hand wheel and nut 28 which abuts against the top of the cap 24 and has threaded engagement with a screw 29 the lower end of which is fixed in the spindle block 27, a graduated dial 30 being provided on the nut for indicating the amount of movement.

Figure 5:
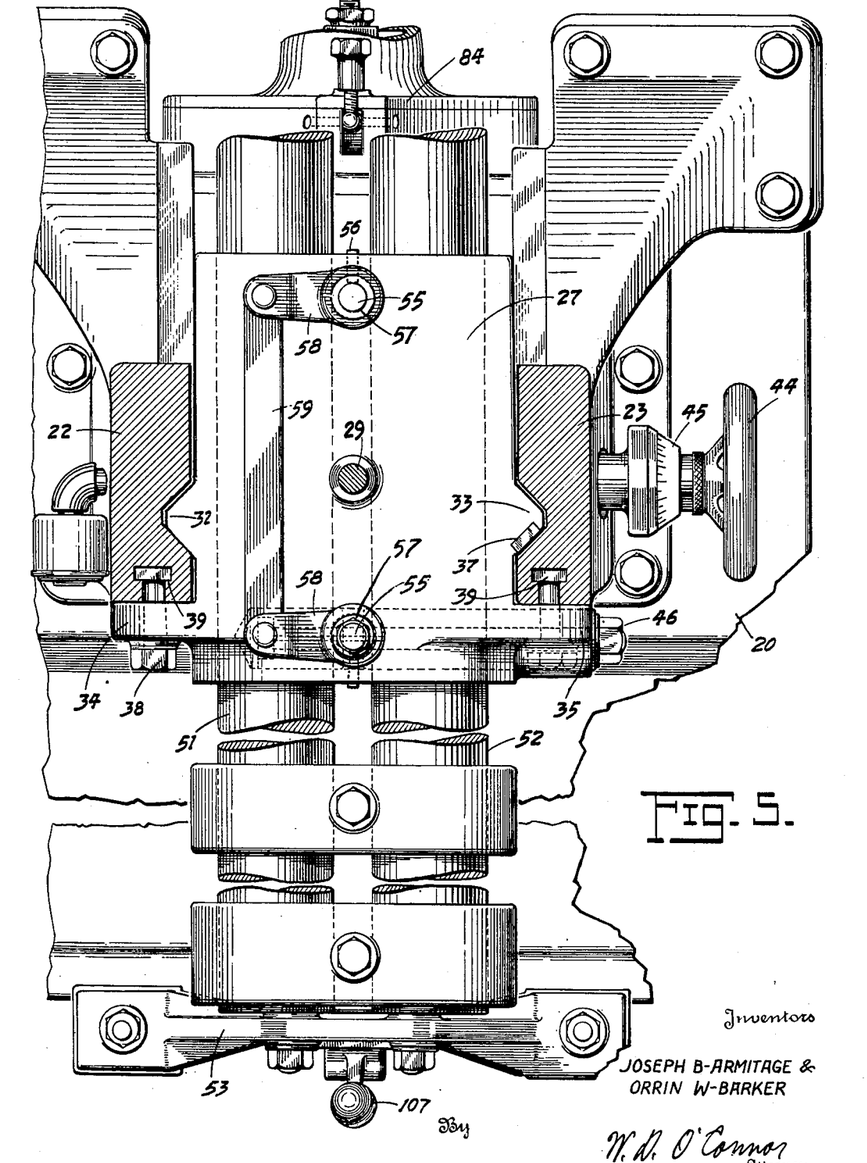
Fig. 5 is an enlarged fragmentary view partly in plan and partly in horizontal section, taken along the line 5—5 in Fig. 1.

As best shown in Fig. 5, the spindle head 27 is provided at its sides with projecting, angularly disposed vertical guiding ways 32 and 33, respectively. The forward sloping surfaces of the angular ways have sliding engagement with complementary angularly disposed surfaces formed in the uprights 22 and 23. At its forward edge, the spindle block 27 is provided with laterally projecting lugs 34 and 35 which have sliding engagement with flat ways formed in a common plane on the forward faces of the uprights 22 and 23 respectively. The angular way 33 on the head is provided with a tapered adjusting gib 37 which may be tightened to effect accurate sliding engagement between the head and the uprights. As may readily be seen, when the gib 37 is tightened it moves into engagement with the complementary way in the upright 23 and draws the lug 35 against the forward face of the upright. Simultaneously, the wedging action of the gib upon the angularly disposed sliding surface of the upright 23 forces the entire head 27 to the left and effects a similar wedging action between the sloping forward face of the way 32 and the plane face of the lug 34 upon the complementary surfaces of the upright 22, clearance spaces being provided between the other surfaces of the head and the uprights as indicated in the drawing. This arrangement provides for effecting close adjustment between the sliding head and the cooperating ways of the column structure, to insure accurate movement of the head. After the spindle head has been adjusted to bring the spindle 26 to the desired vertical position, by turning the hand wheel 28, the head 27 may be locked to the uprights by tightening clamping bolts 38 which operate in T-slots 39 in the forward faces of the uprights and project through the lugs 34 and 35 of the head to clamp them against the forward flat ways.

Figures 7, 8, 9:
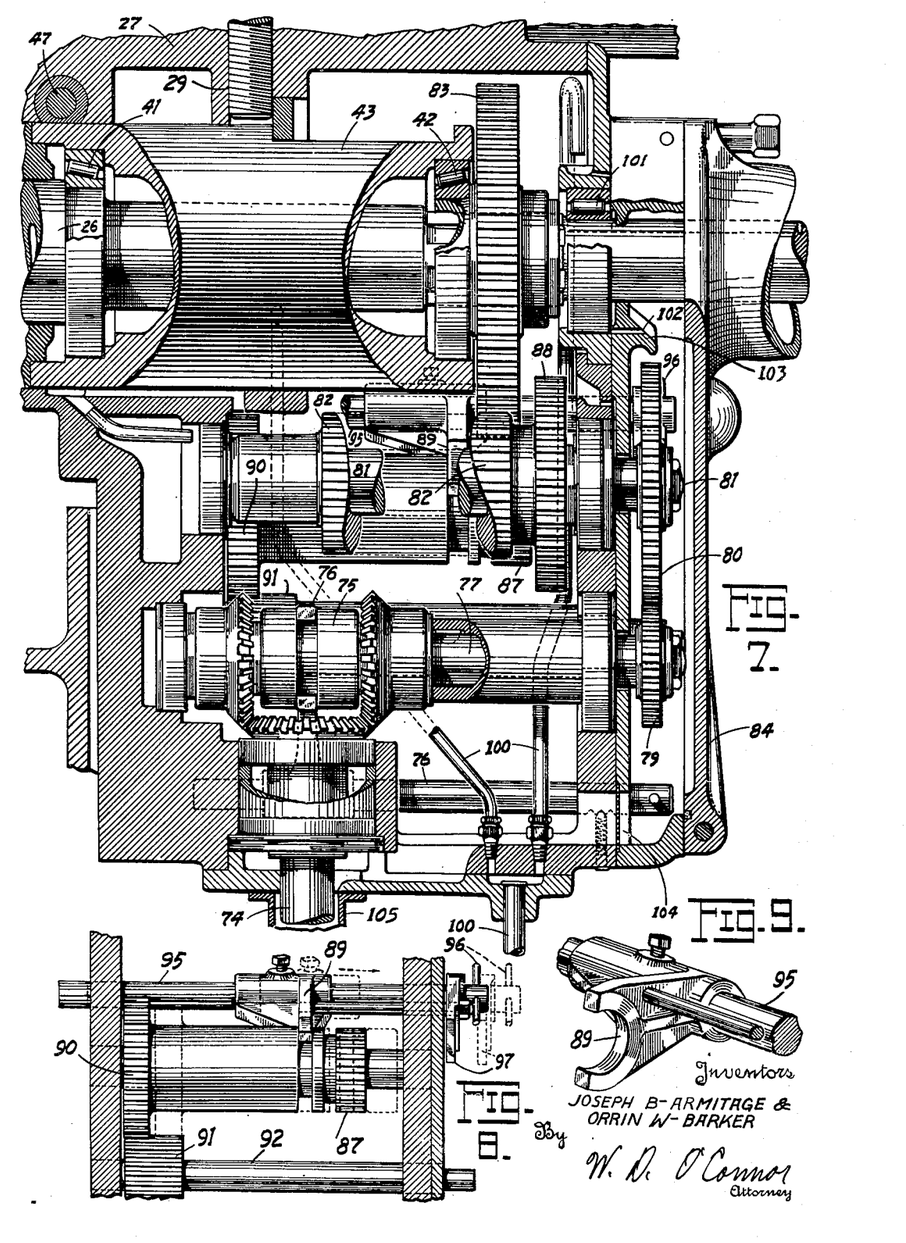
Fig. 7 is an enlarged fragmentary view largely in vertical, axial section through the spindle carrying block, showing the spindle driving transmission mechanism.
Fig. 8 is a detailed view of the gear shifting mechanism in the spindle transmission.
Fig. 9 is a detailed view in perspective of the gear shifting yoke.

To provide for horizontal adjustment of the position of a cutter carried by the spindle 26, the spindle is rotatably supported, by means of anti-friction bearings 41 and 42, in the ends of a cylindrical quill structure 43 which is slidably mounted for axial movement in the head 27, as shown in Figs. 2 and 7. Axial adjustment of the position of the quill is effected by turning a hand wheel 44 at the side of the upright 23, the hand wheel being operatively connected to the quill in well known manner and provided with a graduated dial 45 to indicate the longitudinal position of the spindle. After the spindle quill has been moved to an adjusted position, it may be clamped to the spindle block by turning a clamping nut 46 which draws a clamping element 47 into engagement with the quill, as shown in Fig. 7.

Above the spindle 26, a pair of overarms 51 and 52 are slidably mounted in the spindle block 27 in manner to extend forward to support a cutter carrying arbor, as shown in Fig. 2, the arms being connected at their forward ends to the bed 20 by means of a harness structure 53.

Figure 6:
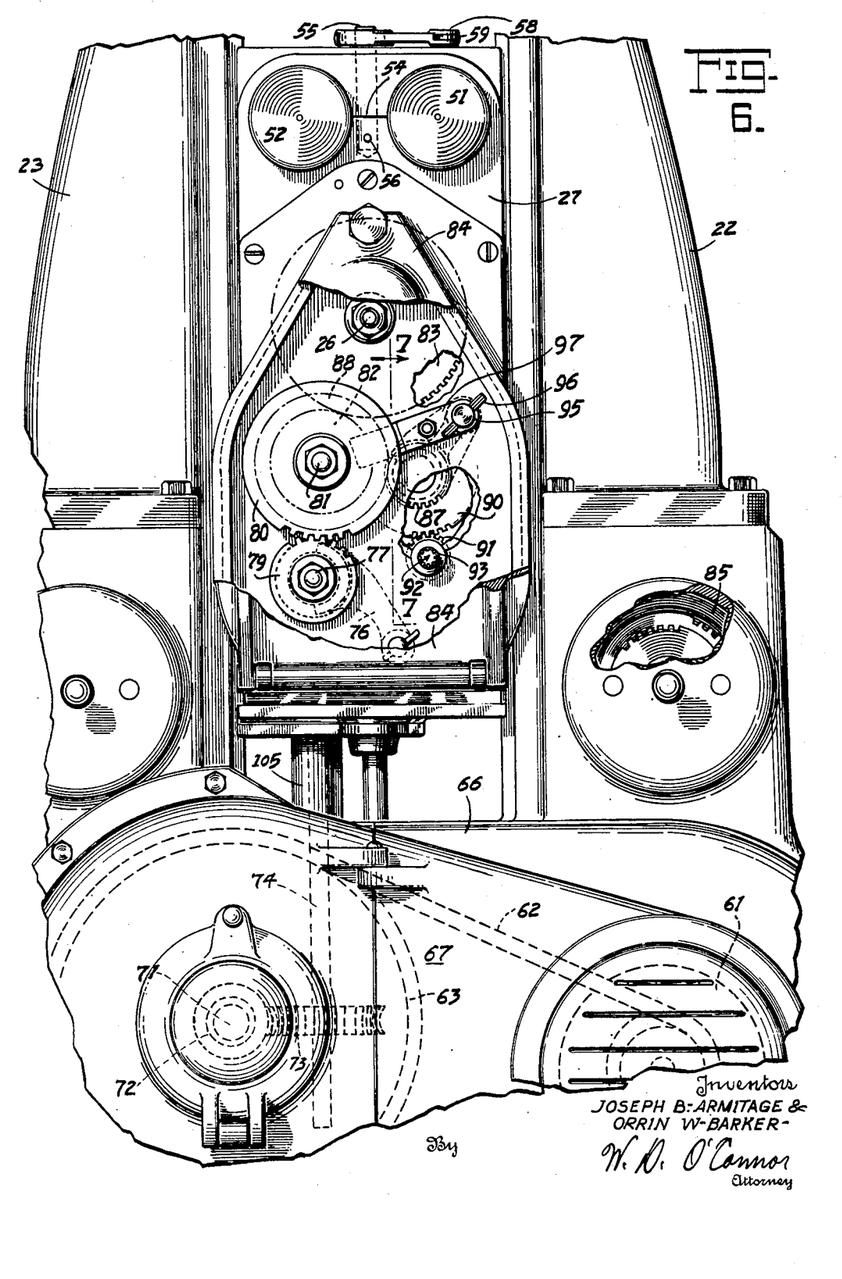
Fig. 6 is another enlarged view in rear elevation of the milling machine with parts broken away to show internal mechanism.

As best shown in Fig. 6, the upper part of the head 27 is provided with a kerf 54 extending horizontally between the arm receiving bores to provide a resilient portion that may be deflected for clamping the arms. For this purpose, a clamping screw 55 is provided between the arms at each end of the head 27, the screws being fixed in the head beneath the kerf 54 by means of pins 56. Clamping nuts 57 are threaded on the upper ends of the screws 55 in manner to bear upon the top of the head and are adapted, when tightened, to deflect the upper portion of the head 27 downward into clamping engagement with the overarms through partially closing the kerf 54. To provide for tightening the two clamping nuts simultaneously, each nut is fitted with an arm 58 the arms being interconnected by a link 59 pivoted at its respective ends to the end of each arm. As shown in Fig. 5, the forward nut 57 is provided with a wrench receiving hexagonal top by means of which both nuts may be tightened to clamp the overarms equally at both ends of the head. As best shown in Fig. 3, each nut 57 is provided with peripheral serrations which are engaged by complementary internal serrations in the cooperating arm 58. By reason of this serrated connection, each arm 58 may be adjusted angularly relative to its cooperating nut 57 in manner to equalize the clamping pressure exerted at the respective ends of the head 27. This arrangement provides for correcting any inequality which may result from wear between the nuts and the screws or the head, since the arms may be removed readily from the nuts at any time and re-engaged with the nut serrations at the position of adjustment providing for equal clamping pressures.

Power for moving the work table 21 and for rotating the cutter spindle 26 is derived from an electric motor 61 mounted in the hollow bed 20, as indicated in Fig. 6, and connected by multiple belts 62 to a main drive pulley 63. For transmitting power to turn the tool spindle and to move the table at feed rate, the pulley 63 may be selectively clutched, under the conthol of a clutch lever 70 on the front of the machine, to a main driving shaft 71 that extends through the bed to the front of the machine and serves to drive the table 21 as explained in the previously mentioned copending parent application, now Patent No. 2,407,913. Power for rotating the spindle 26 is taken from the main shaft 71 by means of a worm 72 that is fixed on the shaft and has meshing engagement with a worm wheel 73 rotatably supported in the bed 20. The worm wheel has splined connection with a vertically disposed splined shaft 74 that is journalled in the spindle head 27 and arranged for vertical movement therewith, the splined connection with the worm wheel 73 providing a driving connection regardless of the vertical position of the spindle head. The vertical shaft 74 delivers power at constant speed to a bevel gear reversing mechanism 75 in the spindle head 27, as shown in Fig. 7. For effecting reversal in the direction of spindle rotation, the reverser 75 may be actuated by a shifting arm 76 to provide for coupling the vertical shaft 74 to a horizontal power driven shaft 77 in manner to drive it in either direction for turning the spindle in the one or the other direction, selectively.

Figure 10:
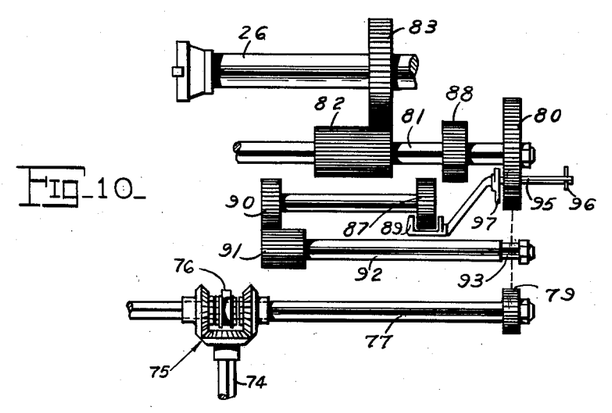
Fig. 10 is an expanded diagrammatic view of the spindle driving speed changing train.

From the horizontal power driven shaft 77 in the head 27, power is transmitted to drive the spindle at a selected rate in either of two speed ranges. When operating in the high speed range, power from the shaft 77 is transmitted by a pick-off gear 79 removably fitted on the end of the shaft, to a complementary pick-off gear 80 similarly fitted on the end of a parallel spindle driving shaft 81, as shown in Figs. 6, 7 and 10. The shaft 81 is provided within the spindle head 27 with a long pinion 82 that meshes with a large gear wheel 83 fixed on the spindle 26 in the rear of the quill 43, the arrangement being such that the gear wheel 83 may slide along the pinion 82 when the spindle and quill are adjusted axially within the head 27.

As may best be seen by reference to Figs. 6 and 7, the pick-off gears 79 and 80 are mounted on the rear face of the head 27 and are protected by means of a hinged cover plate or door 84 which may be opened to provide access to the gear receiving ends of the shafts. Alternative sets of pick-off gears arranged to provide a series of spindle speeds, are stored in covered recesses 85 at the rear of the bed, as shown in Fig. 6.

Figure 11:
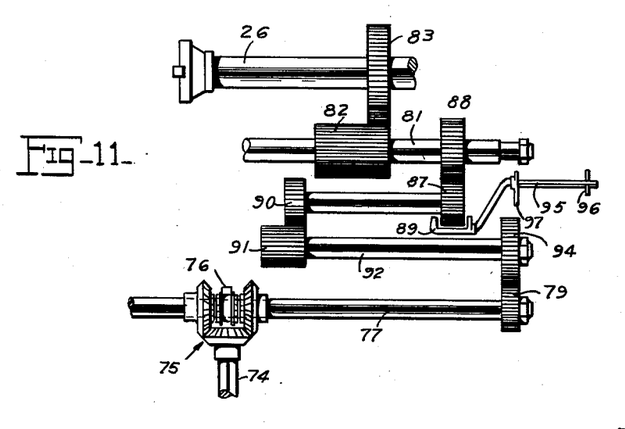
Fig. 11 is a view similar to Fig. 10 but with the gears shown shifted into another position.

For driving the spindle in the low speed range, there is provided a speed reducing or range changing intermediate or back gear mechanism arranged to transmit power indirectly from the power driven shaft 77 to the spindle driving shaft 81. As may best be seen in the diagrammatic views, Figs. 10 and 11, the intermediate speed reducing mechanism includes a shiftable pinion 87 that may be moved into meshing engagement with a complementary gear 88 on the spindle driving shaft 81, as shown in Fig. 11, a shifting fork 89 being provided for this purpose. The pinion 87 has associated with it a gear wheel 90 which meshes with a long pinion 91 fixed on an intermediate shaft 92, the arrangement being such that the gear 90 may slide along the pinion 91 when the pinion 87 is shifted into or out of meshing engagement with the gear 88. The intermediate shaft 92 is provided at its end 93 with means for receiving a pick-off gear 94 adapted to mesh with pick-off gear 79 on the driven shaft 77, as shown in Fig. 11. The pair of pick-off gears transmitting power from the driven shaft 77 to the intermediate shaft 92 replace the pick-off gear direct driving connection between the shaft 77 and the spindle driving shaft 81 represented by the gears 79 and 80 shown in Figs. 6, 7, and 10 in the drawing.

Since the driving mechanism would be locked, and injury might possibly result to the machine, if intermeshing pick-off gears should be applied to both the shaft 81 and the shaft 92 at the same time, means are provided for preventing the application of a pick-off gear to the shaft 81 when the intermediate pinion 87 is meshed with the gear 88 for driving the shaft 81. As shown in Figs. 8, 10, and 11 of the drawing, the shifting fork 89 associated with the pinion 87 is provided with an actuating rod 95 that extends through the rear wall of the head 27 into the pick-off gear compartment and is provided at its end with an actuating handle 96 which is accessible when the hinged door 84 is open, the arrangement being such that the handle 96 may be drawn outward to engage the intermediate drive and moved inward to disengage the drive. To prevent application of a pick-off gear to the shaft 81 when the pinion 87 is engaged with the gear 88, the shifting rod 95 is provided with an interlocking or interfering member 97 so arranged that it moves outward into the space otherwise occupied by the pick-off gear on the shaft 81 when the handle 96 is pulled out to engage the pinion 87 with the gear 88, as shown in Fig. 11, thus preventing a pick-off gear from being placed on the end of the shaft 81 while the intermediate speed reducing mechanism is engaged. Furthermore, this interlocking arrangement compels disengagement of the intermediate drive when it is desired to operate in the high speed range with a pick-off gear on the shaft 81. This is desirable even though no pick-off gear is applied to the shaft 92, since with the spindle driving shaft 81 operating in the fast range, the intermediate shaft 92 would be turned at excessive speed which would result in undue wearing of the mechanism. In the event that a pick-off gear should be applied to the shaft 92 when operating in the high speed range, and meshed with either the pick-off gear 79 on the shaft 77 or the pick-off gear 80 on the shaft 81, no harm would be done since, with the pinion 87 shifted out of mesh, this would result merely in turning the intermediate mechanism idly at moderate speed.

As appears in Fig. 7, lubricating fluid from a pump (not shown) is forced upward into the spindle head 27 through suitable connecting conduits 100, one of which discharges above an antifriction bearing 101, mounted in the rear wall of the head and serving to support the rearward portion of the spindle 26. The spindle is arranged to slide within the inner race of the bearing 101 when the quill 43 is moved longitudinally the bearing race being slidably keyed to the spindle to prevent relative rotation therebetween. From the bearing 101, the lubricant drains through a passageway 102, onto a lip 103 from which it flows onto the pick-off gears 80 and 79 to lubricate them. Lubricant draining from the pick-off gears flows through a screened opening 104, into the lower part of the head 27 where it mingles with other excess lubricant draining from within the head. The lubricant collecting in the bottom of the head returns to a sump in the bottom of the machine bed through a telescoping tube 105 that constitutes a guard for the vertically disposed spindle driving shaft 74.

The work supporting table 21 is driven to reciprocate in cooperating relationship with the tool spindle 26, by means of a feed screw 106 shown in Fig. 1, that is rotatably supported beneath the table in cooperating relationship with a stationary nut (not shown) fixed in the bed 20. The rate and direction of power movement of the table 21 may be controlled manually by actuating a lever 107 pivotally mounted on the front of the machine as is fully explained in the aforementioned parent application, now Patent No. 2,407,913.

From the foregoing detailed explanation of the operation of the exemplifying milling machine herein set forth as a practical embodiment of the present invention, it will appear that there has been provided an improved machine tool structure and actuating transmission mechanism that is especially adapted for convenient operation and that may be adjusted and maintained with facility.

Although the illustrative embodiment of the invention has been described in considerable detail for the purpose of fully disclosing a practical operative structure by means of which the invention may be practiced, it is to be understood that the particular apparatus herein described is intended to be illustrative only and that the various novel characteristics of the invention may be incorporated in other structural forms without departing from the spirit and scope of the invention as defined in the subjoined claims.

The principles of the invention having now been fully explained in the foregoing description of an illustrative embodying machine, we hereby claim as our invention:

1. In a machine tool, a driven working element, a source of power, means for transmitting power from said source to said working element at a selected speed, said means comprising a shaft connected to be driven by said source of power and adapted to receive a pick-off gear, a shaft connected to drive said working element and adapted to receive a pick-off gear complementary to and meshing with the pick-off gear on said power shaft, an intermediate shaft adapted to receive a pick-off gear to mesh with the pick-off gear on said power shaft, a speed changing mechanism selectively engageable to connect said intermediate shaft to said element driving shaft, and means associated with said speed changing mechanism operatively disposed in the space normally occupied by the pick-off gear when on the driving shaft to prevent the application of a pick-off gear to said element driving shaft whenever said speed changing mechanism is connected to said intermediate shaft.

2. In a machine tool power transmission mechanism, the combination with a driven member and a source of driving power, of a speed changing gear train disposed to connect said source of power to said driven member to drive it at selected speed, said gear train comprising shiftable gearing and interchangeable gearing, and an interlocking mechanism associated with said shiftable gearing and said interchangeable gearing and shiftably disposed in the space normally occupied by certain of said interchangeable gearing to prevent application of certain of said interchangeable gearing when said shiftable gearing is in a predetermined one of its positions.

3. In a machine tool having a driven working element, means for driving said element at selected speed including a pick-off gear changing mechanism and a selectively engageable speed changing mechanism said mechanisms being alternatively operable, and an interlocking means operatively disposed to move into and out of the space normally occupied by certain of said pick-off gearing to prevent application of a pick-off gear when said selective speed changing mechanism is engaged and to prevent engagement of said selective speed changing mechanism when said pick-off gear mechanism is operating.

4. In a machine tool support driving mechanism, a driven shaft adapted to receive a pick-off gear, another shaft arranged to receive a complementary pick-off gear, means operatively connecting said second shaft with the support to be driven, a third shaft arranged to receive a pick-off gear intermeshing with a complementary pick-off gear on said driven shaft, a speed changing train selectively engageable to connect said third shaft with said second shaft, and interlocking means associated with said speed changing train and operative when said train is engaged to impinge upon the position normally occupied by said second named pick-off gear to prevent application of a pick-off gear to said second shaft.

5. In a milling machine, the combination of a spindle supporting element, a spindle rotatably mounted on said element, a first power driven shaft rotatably mounted on said element on an axis parallel to and spaced from the spindle axis, an intermediate shaft rotatably mounted on said element, a gear connection between said intermediate shaft and said spindle, said first power driven shaft and intermediate shaft having projecting ends arranged to each receive one of a pair of pick-off gears to form a direct drive between said first power driven shaft and the intermediate shaft to complete the transmission for one spindle speed, a second shaft disposed in parallel relationship with said first and intermediate shafts said second shaft having one end arranged to receive one of a pair of pick-off gears for cooperating relationship with a mating pick-off gear on said first power driven shaft, and back gear mechanism connecting said second shaft with said intermediate shaft whereby a transmission is completed to drive said spindle at a speed in a different range from said first named speed.

6. A milling machine transmission comprising a spindle block, a quill mounted for axially slidable movement in the forward wall of said spindle block, a spindle having its forward end rotatably journalled in said quill and its opposite end rotatably journalled for axially slidable movement in the rear wall of said block, a spindle drive gear affixed to said spindle between said spindle block wall and said quill, said spindle, quill and drive gear being axially slidable as one unit, a gear train comprising a variable speed transmission connected to drive said spindle in any of its axially adjusted positions, shiftable gearing in said gear train providing a selective driving connection to obtain either of two separate speed ranges, interchangeable gearing in said gear train arranged for selective application in either of said separate speed ranges, and an interlocking mechanism operatively disposed to impinge upon the position normally occupied by certain of said interchangeable gearing and thereby prevent the application of certain of said interchangeable gearing when said shiftable gearing is in a predetermined one of its positions.

7. In a power transmission mechanism for driving a rotary element of a machine tool, a source of rotary power, shiftable speed changing gearing selectively engageable to drive said rotary machine element, pick-off gearing selectively applicable to transmit power at selected speed ratio from said source of power either directly to said rotary element or to said shiftable speed changing gearing, and interlocking mechanism associated with said speed changing gearing and operative in the space normally occupied by certain of said pick-off gearing to prevent application of pick-off gearing directly to said rotary element while said speed changing gearing is engaged to drive said element and to prevent engagement of said speed changing gearing while said pick-off gearing is applied to drive said element directly.

8. In a compactly constructed variable speed transmission mechanism, a spindle block having forward and rear walls, a quill mounted for axially slidable movement in the forward wall of said spindle block, a spindle having one end rotatably journalled in said quill and the opposite end rotatably journalled in the rear wall of said spindle block, a driving gear affixed to said spindle between said quill and said rear spindle block wall, means for moving the unitarily slidable structure formed by said quill spindle and drive gear, a primary shaft rotatably journalled in said block on an axis parallel to said spindle and in constant driving engagement with said spindle drive gear, a power shaft rotatably journalled in said block on an axis parallel to said spindle, interchangeable pick-off gears arranged for application to gear receiving ends of said power shaft and said primary shaft for driving said spindle at selectively varying speeds in one speed range, an intermediate shaft rotatably journalled on an axis parallel to said spindle and provided with a gear receiving end, and shiftable gearing arranged to effect a selective driving connection between said intermediate shaft and said primary shaft and simultaneously prevent application of one of said pick-off gears to said primary shaft, whereby a second speed range is obtainable and said interchangeable pick-off gears may be applied to the gear receiving ends of said intermediate shaft and said power shaft for driving said spindle at selectively varying speeds.

JOSEPH B. ARMITAGE.
ORRIN W. BARKER.

REFERENCES CITED

The following references are of record in the file of this patent:

UNITED STATES PATENTS

| Number | Name | Date |
|---|---|---|
| 1,800,267 | Sundstrand | Apr. 14, 1931 |
| 1,940,443 | Blood | Dec. 19, 1933 |
| 2,205,462 | Bennett et al. | June 25, 1940 |
| 2,209,469 | Nenninger et al. | July 30, 1940 |
| 2,218,469 | Hassman | Oct. 15, 1940 |
| 2,227,410 | Johnson | Dec. 31, 1940 |
| 2,283,154 | Koch | May 12, 1942 |
| 2,309,199 | McCormick | Jan. 26, 1943 |
| 2,382,934 | Armitage | Aug. 14, 1945 |

FOREIGN PATENTS

| Number | Country | Date |
|---|---|---|
| 581,720 | Germany | Aug. 1, 1933 |
| 57,011 | Netherlands | Nov. 15, 1944 |